Nov. 20, 1956  R. G. STAPLES, JR., ET AL  2,771,288
WEIGHING DEVICE
Filed Nov. 17, 1953  5 Sheets-Sheet 1

Nov. 20, 1956  R. G. STAPLES, JR., ET AL  2,771,288
WEIGHING DEVICE
Filed Nov. 17, 1953  5 Sheets-Sheet 5

United States Patent Office 2,771,288
Patented Nov. 20, 1956

2,771,288

WEIGHING DEVICE

Robert G. Staples, Jr., Camden, N. J., and Martin W. Bougher, Sr., Montgomeryville Township, Pa., assignors to Link-Belt Company, a corporation of Illinois Application November 17, 1953, Serial No. 392,594

10 Claims. (Cl. 265—52)

This invention relates to new and useful improvements in weighing devices and deals more particularly with the mechanism that is employed for handling the objects that are successively advannced into weighing relationship with such devices.

There is a frequently occurring need in certain industries for a weighing device which can be used in conjunction with intermittently driven conveyors of various types for weighing products and materials while they are being transported to or through a processing operation. One example of the above type of installation is a steel mill where long strips of rolled steel are coiled, loaded onto an intermittently driven conveyor for movement through a path of sufficient length to permit cooling of the coils, and removed from the conveyor for subsequent operations or storage. It is frequently necessary or desirable to weight the coils at some point along the path of the conveyor, in which event the weight of each coil must be accurately determined by handling the coil in such a manner as to prevent damaging the same or unnecessarily delaying operation of the conveyor.

It is the primary object of this invention to provide a weighing device having mechanism for successively handling intermittently transported objects so as to temporarily support each one of the same entirely independently of the transporting mechanism during the weighing operation, the handling mechanism being movable out of interfering relationship with the transporting mechanism during periods of movement of the latter.

Another important object of the invention is to provide a weighing device having mechanism for symmetrically engaging and supporting the successive objects that are transported to the device for weighing by an intermittently operated conveying mechanism.

Still another object of the invention is to provide a weighing device having object supporting parts which are laterally and vertically movable relative to an intermittently operated object transporting mechanism so that said parts will approach from opposite sides and lift successive objects that are carried to the weighing device by the mechanism, the return or reverse movements of the object supporting parts away from the mechanism permitting free movement of the latter relative to the weighing device.

Other objects and advantages of the invention will be apparent during the course of the following description.

Figure 1:
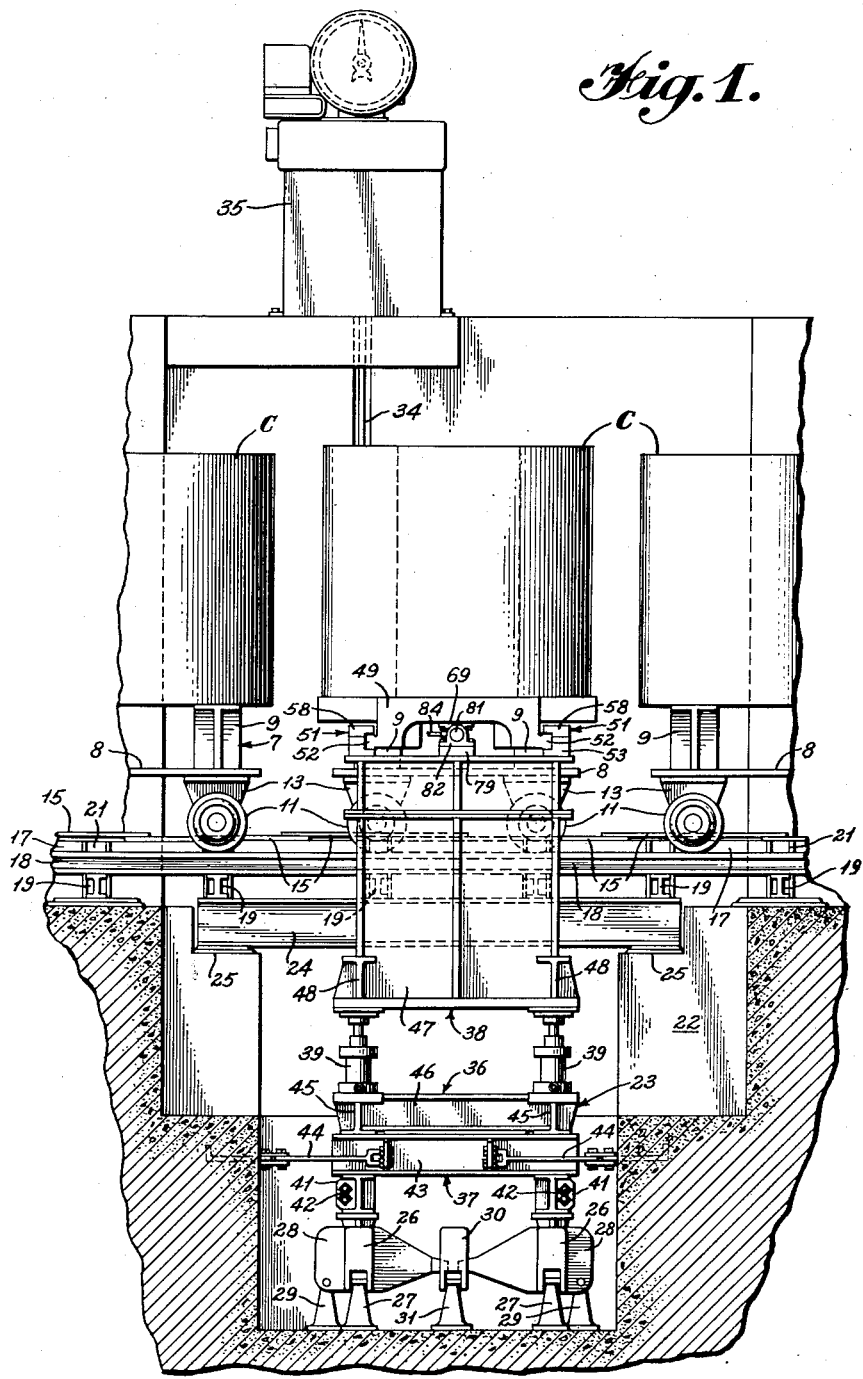
Figure 2:
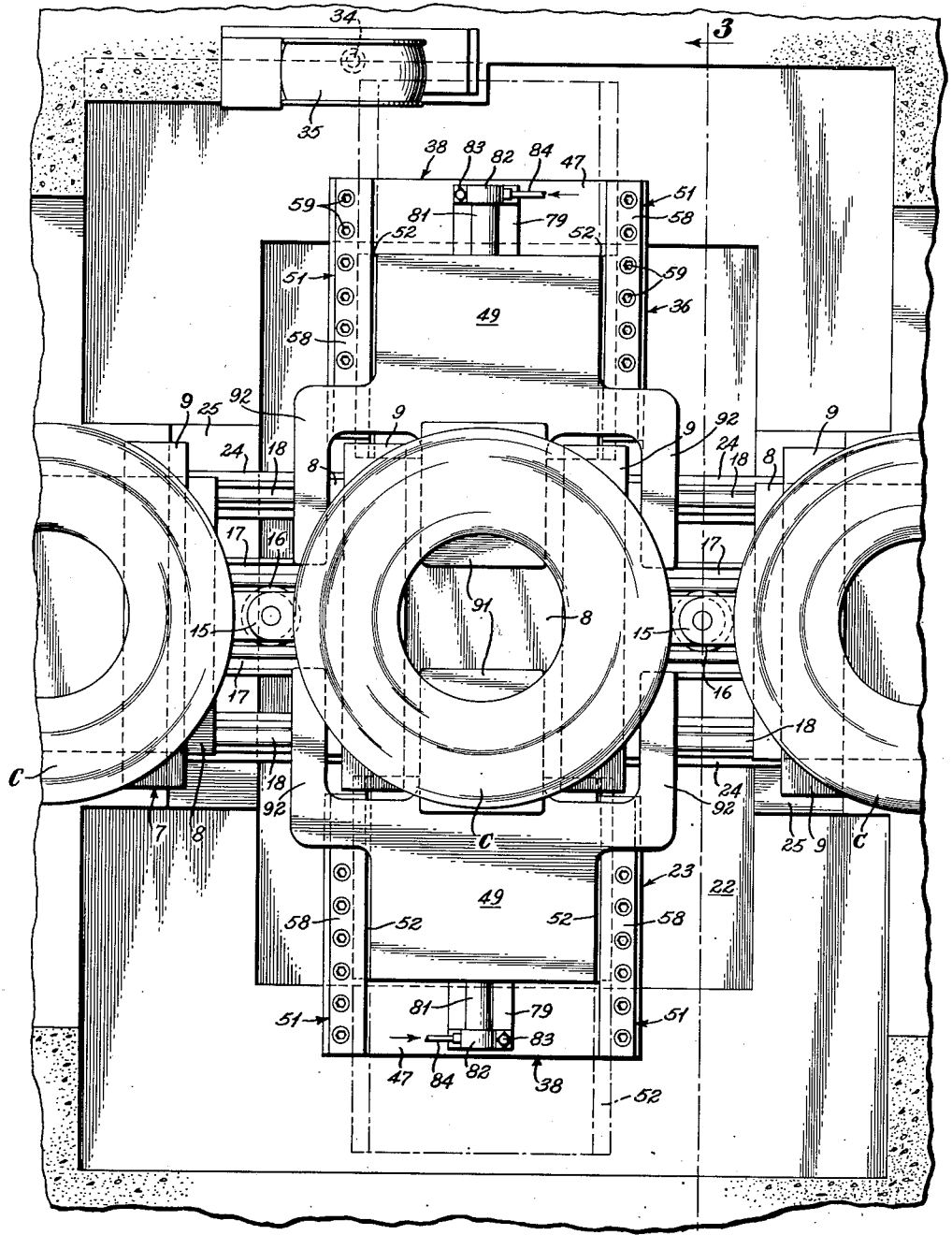
Figure 3:
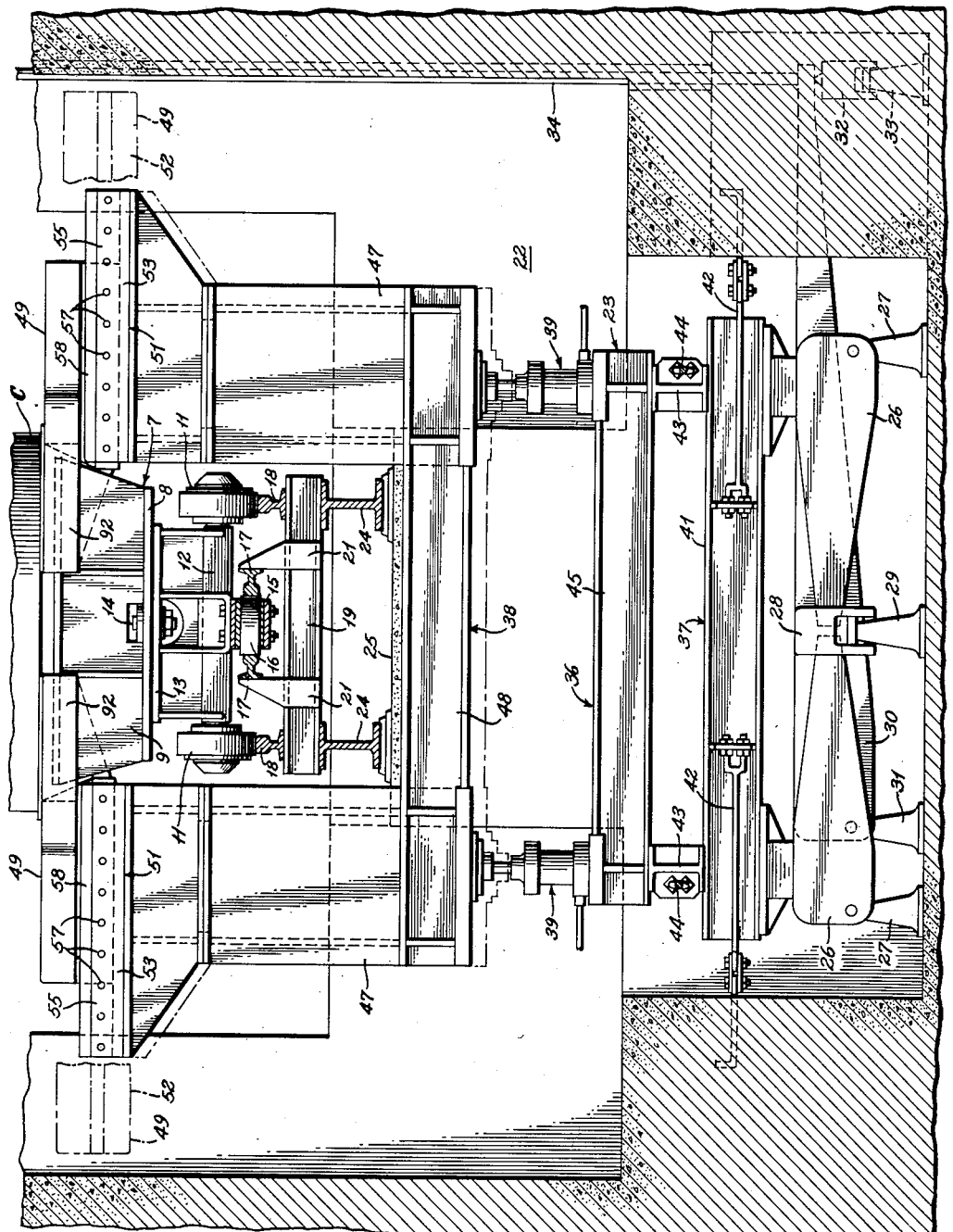
Figure 4:
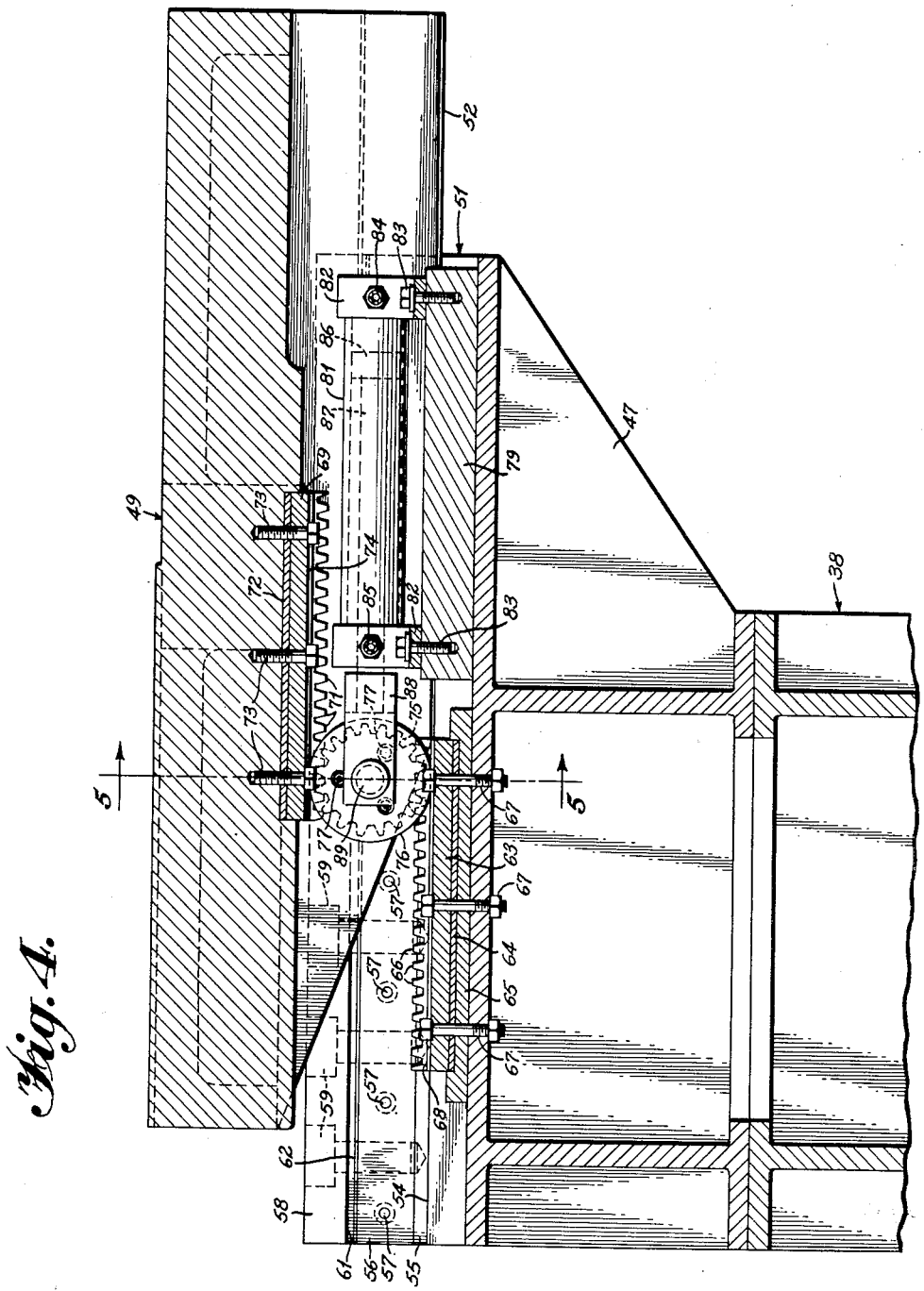
Figure 5:
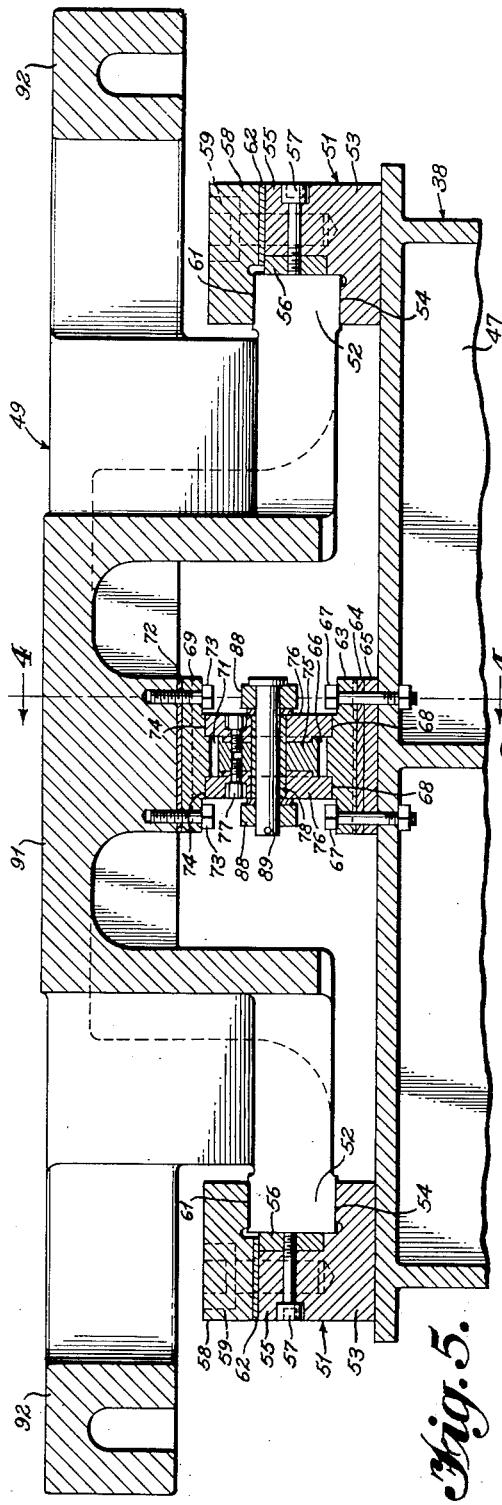
Figure 6:
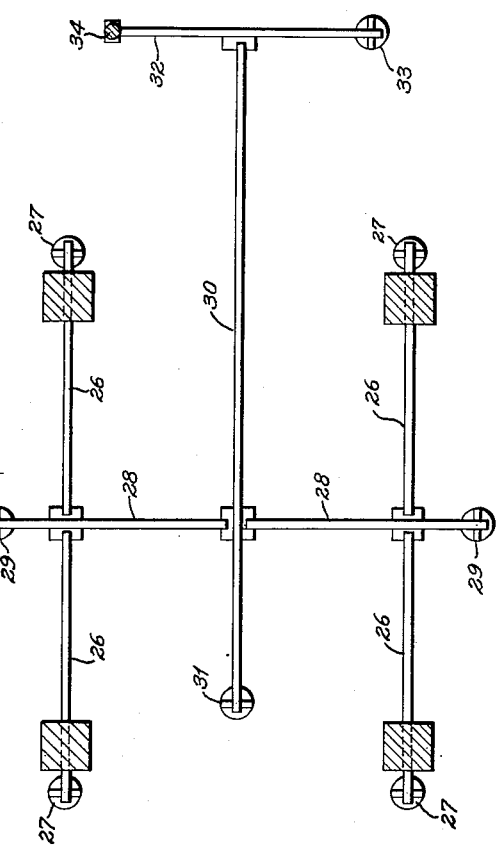

In the accompanying drawings forming a part of this specification and in which like reference characters are employed to designate like parts throughout the same, Figure 1 is a side elevational view of a weighing device embodying the invention, Figure 2 is a top plan view of the device illustrated in Fig. 1, Figure 3 is a vertical sectional view taken on line 3—3 of Fig. 2, Figure 4 is a vertical sectional view taken on line 4—4 of Fig. 5, Figure 5 is a vertical sectional view taken on line 5—5 of Fig. 4, and Figure 6 is a diagrammatic view of the system of balanced scale beams employed in the weighing device.

In the drawings, wherein for the purpose of illustration is shown the preferred embodiment of this invention, and first particularly referring to Figs. 1 to 3, inclusive, there is shown a steel coil conveyor designated in its entirety by the reference character 7. The conveyor 7 includes an endless series of interconnected cars 8 that are each provided with a pair of vertically and transversely extending supporting members 9 for engaging the lower end surfaces of the steel coils C to support the coils for transportation by the conveyor. The wheels 11 of each car 8 are arranged in pairs with each pair of wheels being mounted on a single axle 12 that is pivotally connected to the car by means of a bracket 13 and a pivot pin 14. Extending between and connecting the successive cars 8 of the conveyor 7 is a link chain 15 having its adjacent pitches pivotally connected by conventional joint pins on which are mounted rolls 16 which cooperate with guide rails 17 to control the path of movement of the cars 8.

The wheels 11 travel on the rails 18 which are in turn supported by transverse beams 19 that are spaced longitudinally along the conveyor and upon which are also mounted the brackets 21 for supporting the guide rails 17.

Located beneath the conveyor 7 is a pit 22 in which is mounted a device 23 for weighing the coils C that are intermittently transported to a position above the pit by the conveyor. The supporting rails 18 and guide rails 17 span the pit 22 where they are supported upon bridging members 24 which rest at their opposite ends upon ledges 25 formed at opposite sides of the pit.

Positioned in the lower portion of the pit 22 is a system of balanced scale beams the arrangement of which is best illustrated in Fig. 6. It will be noted that the system includes four load supporting beams 26 that are arranged in transversely alined and longitudinally spaced pairs with each beam 26 having a pivotal mounting 27 at its outer end portion. The inner end portions of each transversely alined pair of beams 26 rest upon and are supported by engagement with one of the two longitudinally alined beams 28.

The beams 28 are oppositely arranged with their outer end portions being pivotally mounted at 29 and their inner end portions being supported by engagement with the transverse beam 30 adjacent the geometric center of the rectangle defined by the pivotal mountings 27 of the load supporting beam 26. The transverse beam 30 is provided with a pivotal support 31 at one of its end portions and at its other end portion is supported by engagement with the beam 32 at one side of the pit 22. One end of the beam 32 is pivotally supported at 33 and the opposite end of the beam 32 is connected by the rod 34 to a conventional type indicating and recording device 35, as illustrated in Figs. 1 and 2.

Positioned upon and supported by the scale beams 26 is a frame 36 having a base portion 37 and an elevating portion 38 with hydraulic jacks 39 positioned therebetween to permit the portion 38 of the frame to be elevated relative to the base portion 37.

Referring now to Figs. 1 and 3 for a detail description of the frame 36, it will be noted that the base portion 37 is formed with transversely extending I-beams 41 which rest upon and are pivotally connected to the load supporting beams 26. The beams 41 are anchored to the sides of the pit 22 by sway braces 42 in such a manner as to restrain excessive lateral movement while permitting limited vertical movement of the frame. Mounted on opposite ends of the beams 41 are two longitudinal beams 43 which are connected to the front and back walls of the pit 22 by sway braces 44 in a manner to restrain excessive longitudinal movement while permitting limited vertical movement of the frame. Two additional transverse beams 45 are mounted on opposite ends of the beams 43 and are in turn connected at their opposite end portions by longitudinally extending side braces 46. The beams 45 and side braces 46, therefore, form a rectangular top for the base portion 37 of the frame with the corners of the rectangular top being arranged directly above the points of connection between the base portion 37 and the load supporting scale beams 26.

The hydraulic elevating jacks 39 are mounted on the corners of the rectangular top portion of the base portion 37 and are connected to a suitable source of supply of pressure fluid for operating the jacks to raise and lower the elevating portion 38 of the frame 36.

The portion 38 of the frame 36 is formed with transversely spaced upright portions 47 that are arranged on opposite sides of the path of movement of the cars 8 along the rails 18. Each of the spaced frame portions 47 is mounted on a pair of the jacks 39 and is movable vertically relative to the base position 37 of the frame thereby. Extending transversely between the lower portions of the two spaced frame portions 47 are two transverse beams 48 which connect the frame portions below the level of the bridging members 24 in the pit 22. It will be noted in Fig. 1 that sufficient clearance is provided between the tops of the beams 48 and the bottoms of the bridging members 24 to permit limited vertical movement of the elevating portion 38 relative to the base portion 37 of the frame.

At the top of each spaced frame portion 47, a platform member 49 is mounted for lateral movement relative to the frame portion. As illustrated by the broken-lines in Figs. 2 and 3, the platform members 49 are laterally movable between coil engaging positions underlying the coil C and release positions outwardly of and below the bottom of the coil C.

The vertical movement of the spaced frame portions 47 is illustrated by the broken-lines in Fig. 3 and is sufficient to raise and lower the tops of the platform members 49 to levels above and below, respectively, the tops of the members 9 on the cars 8. When the platform members 49 are in their coil engaging positions, therefore, upward movement of the frame portions 47 will cause the platform members to lift the coil C from the members 9 on the cars 8. Downward movement of the frame portions 47, on the other hand, will return the coil C to the position where it rests on the members 9 of the cars 8 and will lower the platform members 49 out of engagement with the bottom surface of the coil.

Referring now to Figs. 4 and 5 for a detail description of one of the two identical platform members 49, the said member is slidably mounted on the top of its frame portion 47 by guides 51 which engage slides 52 extending laterally outwardly from the bottom portion at each side of the platform member. Each guide 51 is formed with a base member 53 which is welded, or otherwise suitably connected, to the top of the frame portion 47 and is provided with an upwardly facing bearing surface 54 for engagement with the bottom surface of the associated slide 52.

Each base member 53 is further provided with an upwardly extending portion 55, the inwardly facing side of which has mounted thereon a bearing plate 56 by means of the screws 57 to provide bearing engagement between the inner faces of the plates and the outer faces of the slides 52. A cap 58 is rigidly secured to the vertically extending portion 55 of each base member 53 by a plurality of set screws 59 and is provided with a downwardly facing bearing surface 61 overlying the upwardly facing surface 54 of the base member 53. The vertical spacing between the surfaces 54 and 61 is adjustable by means of shims 62 positioned between the base member 53 and cap 58 to maintain the surface 61 in proper bearing engagement with the top surface of the slide 52.

Mounted on the frame portion 47 midway between the guides 51 is a rack member 63. Between the rack member 63 and the top of the frame portion 47 are positioned a shim 64 and a base plate 65 with the shim being of the preselected thickness to accurately position the teeth 66 of the rack member at a desired distance above the top of the frame portion. Bolts 67 extend through alined openings in the rack member 63, the shim 64, the base plate 65, and the top of the frame portion 47 to connect these members to the frame portion. The rack member 63 is provided with a bearing surface 68 at each side of the teeth 66 for a purpose that will be later described.

A second rack member 69 is fastened to the bottom face of platform member 49 in vertically spaced alinement with the rack member 63 and is provided with teeth 71. A shim 72 is positioned between the rack member 69 and the platform member 49 and is of a preselected thickness to maintain the proper distance between the opposed sets of teeth 66 and 71. The rack member 69 is connected to the platform member 49 by capscrews 73, or the like. On opposite sides of the teeth 71, the rack member 69 is provided with bearing surfaces 74 that are arranged in vertically opposed relationship with the bearing surfaces 68 of the rack member 63.

Positioned between the teeth 66 and 71 of the rack members 63 and 69, respectively, is a meshing spur gear 75. Bearing discs 76, of a larger diameter than the spur gear 75, are rigidly connected to the opposite sides of the spur gear by means of countersunk bolts 77. A bushing 78 extends through the axially alined bores of the spur gear 75 and the bearing discs 76. It will be readily apparent that the bearing discs 76 will prevent lateral displacement of the spur gear 75 relative to the rack teeth 71 and 66 and will maintain the desired distance between the opposed teeth 71 and 66 to prevent binding on the teeth of the spur gear.

Mounted beyond one end of the rack member 63 is a support block 79 which is welded, or similarly connected, to the frame portion 47. A cylinder 81 is mounted on the block 79 by means of brackets 82 and cap screws 83. The axis of the cylinder 81 intersects and is normal to the axis of the spur gear 75. At the outer end of the cylinder 81, a connection 84 is provided for the controlled flow of pressure fluid from a suitable source, not illustrated, into and out of the cylinder. A similar connection 85 is provided at the inner end of the cylinder 81 for permitting the controlled flow of pressure fluid into and out of this end of the cylinder.

Positioned within the cylinder 81 between the connections 84 and 85 is a double-acting piston 86 which is connected to a rod 87 that extends through the inner end of the cylinder. Mounted on the end of the rod 87 is a bifurcated bracket 88, the spaced arms of which are arranged outwardly of the discs 76 and are provided with alined openings which register with the bore of the bushing 78. A pin 89 is positioned to extend through the alined openings in the bracket 88 and the bore of the bushing 78 to rotatably connect the assembled gear 75 and discs 76 to the end of the piston rod 87.

As illustrated in Fig. 4, the gear 75 is positioned between the teeth 66 and 71 of the rack members 63 and 69, respectively, with the inner end of the rack member 69 overlying the outer end of the rack member 63 when the piston 86 is in its retracted position. Movement of the piston 86 toward the inner end of the cylinder 81, therefore, will cause the gear 75 to be rolled over the teeth 66 of the rack member 63 while meshing of the gear teeth and the teeth 71 of the rack member 69 will cause the latter to be advanced laterally inwardly to a position at which the outer end of the rack member 69 will overlie the inner end of the rack member 63. In other words, movement of the piston 86 through a given distance will effect movement of the platform member 49 through twice that distance.

Referring now to Fig. 2, it will be noted that the platform members 49 are provided with inwardly extending, laterally spaced inner and outer arms 91 and 92, respectively. It will be further noted that the inner arms 91 are so dimensioned as to fit between the supporting members 9 of each car 8 of the conveyor 7 and that the outer arms 92 are spaced from the inner arms sufficient distances to accommodate the supporting members.

The operation of the weighing device will be described as follows:

The conveyor 7 is intermittently operated to successively deliver coils C to the position above the weighing device 23 at which the spaces between the inner and outer arms 91 and 92, respectively, of the platform members 49, are alined with the supporting members 9 on the cars 8. After a coil C is delivered to the above described location, the conveyor 7 is stopped during the weighing of that coil. It will be appreciated that during movement of the conveyor, the platform members 49 will be in their fully retracted positions to prevent interference between the arms 91 and 92 and the supporting members 9 of the conveyor cars 8.

After a coil C is positioned above the weighing device 23, the platform members 49 are moved toward each other until their inner and outer arms underlie the bottom surface of the coil by the admission of pressure fluid into the connections 84 at the outer ends of the cylinders 81. The elevating portion 38 of the frame 36 is then raised vertically by the admission of pressure fluid to the hydraulic elevating jacks 39 to lift the coil C from the supporting members 9 of the conveyor car 8 so that the entire weight of the coil rests upon the platform members 49. It will be noted that at this time the weight of the coil C on the platform members 49 is symmetrically applied to the system of balanced scale beams upon which the frame 36 is supported.

The application of the load of the coil C to the system of balanced scale beams by the platform members 49 and the frame 36 will cause the weight of the coil to register on and be recorded by the device 35. The coil, thereafter, will be lowered to rest upon the supporting members 9 of the conveying car 8 by releasing the pressure fluid from the hydraulic elevating jacks 39. The platform members 49, thereafter, will be moved away from each other by the admission of pressure fluid to the cylinders 81 through the connections 85 and the release of the pressure fluid from the cylinders through the connections 84. The succeeding coil C is then moved into position above the weighing device by the conveyor 8 and the above described weighing operation is repeated.

It is to be understood that the form of this invention herewith shown and described is to be taken as a preferred example of the same, and that various changes in the shape, size, and arrangement of parts may be resorted to without departing from the spirit of the invention or the scope of the subjoined claims.

Having thus described the invention, we claim:

1. In a device of the type defined, intermittently operated conveying means for delivering objects successively to a location at which the weight of each object is to be determined, a weight responsive device mounted in a fixed position at said location, an object supporting frame mounted on said device for varying the response thereof in accordance with the weight of the object supported by the frame, said frame having spaced portions arranged on opposite sides of said conveying means, object engaging means mounted on each spaced frame portion for lateral movement relative thereto, means mounted on said spaced frame portions for moving said object engaging means laterally into and out of cooperating positions in readiness for engaging the objects delivered successively to said location by the delivering means, and means mounting said spaced frame portions on the remainder of the frame for movement relative to the latter and to said conveying means to cause their object engaging means to lift each object from and return it to the conveying means.

2. In a device of the type defined, intermittently operated conveying means for delivering objects successively to a location at which the weight of each object is to be determined, a weight responsive device mounted in a fixed position at said location, an object supporting frame mounted on said device for varying the response thereof in accordance with the weight of the object supported by the frame, said frame having spaced portions arranged on opposite sides of said conveying means, an object engaging member mounted on each spaced frame portion for lateral movement relative thereto, means mounted on said spaced frame portions for moving the object engaging members laterally toward each other into cooperating positions in readiness for engaging an object when it is delivered to said location by said conveying means and laterally away from each other into positions for permitting delivery of the next successive object to said location by said conveying means, and means mounting said spaced frame portion on the remainder of the frame for movement relative to the latter and to said conveying means to cause their object engaging members to lift each object from and return it to the conveying means.

3. In a device of the type described, intermittently operated conveying means having spaced members for supporting objects thereon for successive delivery to a location at which the weight of each object is to be determined, a weight responsive device mounted in a fixed position at said location, an object supporting frame mounted on said device for varying the response thereof in accordance with the weight of the object supported by the frame, said frame having spaced portions arranged on opposite sides of said conveying means, an object engaging member mounted on each spaced frame portion for lateral movement relative thereto, means mounted on said spaced portions for moving the object engaging members laterally into and out of closely spaced underlying relationship with the bottom portions of the objects between said supporting members when the objects are delivered to said location by said conveying means, and means mounting said spaced frame portions on the remainder of said frame for movement upwardly and downwardly relative to the latter and to said conveying means to cause said object engaging members to lift each object from and return it to the conveying means.

4. In a device of the type described, intermittently operated conveying means having spaced members for supporting objects thereon with laterally opening spaces under the objects, said conveying means delivering the objects successively to a location at which the weight of each object is to be determined, a weight responsive device mounted in a fixed position at said location, an object supporting frame mounted on said device for varying the response thereof in accordance with the weight of the object supported by the frame, said frame having spaced portions arranged on opposite sides of said conveying means, a platform mounted on each spaced frame portion for lateral movement relative thereto, means mounted on said spaced portions for moving the platforms into and out of said laterally opening spaces in closely spaced underlying relationship with like portions of the objects delivered to said location by said conveying means, and means mounting said spaced frame portions on the remainder of said frame for movement upwardly and downwardly relative to the latter and to said conveying means to cause said platforms to engage and lift each object from and return it to the conveying means.

5. In a device of the type described, intermittently operated conveying means having longitudinally spaced object supporting members for delivering objects successively to a location at which the weight of each object is to be determined, a weight responsive device mounted in a fixed position at said location, an object supporting frame mounted on said device for varying the response